Feb. 10, 1948.   V. G. JARMAN   2,435,628
MATERIAL WORKING APPARATUS
Filed Sept. 23, 1944   3 Sheets-Sheet 1

INVENTOR
V. G. JARMAN
BY
ATTORNEY

Feb. 10, 1948.  V. G. JARMAN  2,435,628
MATERIAL WORKING APPARATUS
Filed Sept. 23, 1944  3 Sheets-Sheet 2

INVENTOR
V. G. JARMAN
BY  J. H. B. Whitfield
ATTORNEY

Feb. 10, 1948. V. G. JARMAN 2,435,628
MATERIAL WORKING APPARATUS
Filed Sept. 23, 1944 3 Sheets-Sheet 3

INVENTOR
V. G. JARMAN
BY
ATTORNEY

Patented Feb. 10, 1948

2,435,628

UNITED STATES PATENT OFFICE 2,435,628

MATERIAL WORKING APPARATUS

Vincent G. Jarman, Watchung, N. J., assignor to Western Electric Company, Incorporated, New York, N. Y., a corporation of New York Application September 23, 1944, Serial No. 555,554

14 Claims. (Cl. 164—48)

This invention relates to material working apparatus, and more particularly to apparatus for cutting grid structures into given lengths.

In the manufacture of certain types of grids for use in vacuum tubes, structures, many times the length of the grids to be produced therefrom, are formed by placing lengths of supporting wires in parallel spaced positions on a mandrel, winding the fine grid wire spirally thereon and subsequently welding the convolutions of the grid wire to the supporting wires. These structures may also vary in size, depending upon the size or kind of vacuum tube of which their grids are to be a part. Furthermore, the grids are of a delicate nature and must be handled carefully to avoid damage to the grid wire.

An object of the invention is to provide a material working apparatus which is simple in structure and highly efficient in cutting material, such as grid structures, into given lengths.

With this and other objects in view, the invention comprises a material working apparatus including a material working element operable relative to a given path in which a tunnel is disposed, means being associated with the tunnel to direct air under pressure relative thereto to cause movement of the material through the tunnel relative to the element.

Other objects and advantages will be apparent from the following detailed description when considered in conjunction with the accompanying drawings, wherein Fig. 1 is a top plan view of the apparatus;

Fig. 7 is a fragmentary perspective view of one of the cutting elements and its relationship with the material, and Fig. 8 is a top plan view of the material illustrating the result of the apparatus thereon.

Figure 1:
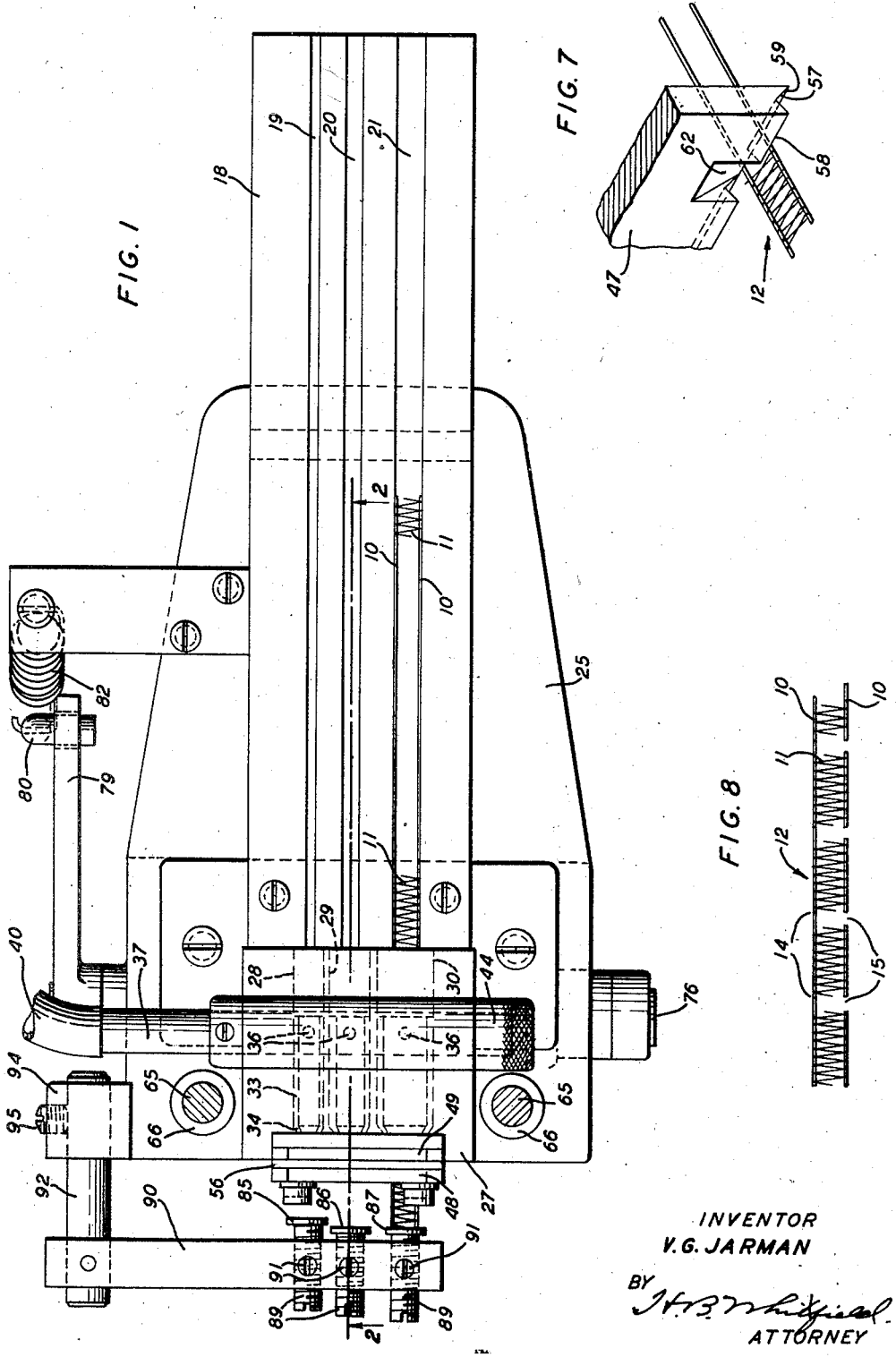

Referring now to the drawings, attention is first directed to the material for which the apparatus was designed to cut into given lengths. In the present embodiment, one size of the material is illustrated in Fig. 8 and may be defined as a grid structure composed of parallel supporting wires 10 upon which a fine grid wire 11 is spirally wound, the convolutions, or groups of the convolutions thereof, being welded to the supporting wires.

The purpose of the apparatus is to cut the grid structure, which is indicated generally at 12, into predetermined lengths to provide a resulting structure, wherein one of the supporting wires is longer than the other. To accomplish this result, one of the wires, namely the upper one, shown in Fig. 8, is cut at given points indicated at 14, while the other supporting wire has portions cut therefrom, as indicated at 15. Therefore, the leading ends of the supporting wires 10 lie in a common plane at right angles to their axes, while the rearmost ends of the severed portions are out of alignment with each other due to the fact that one leg or supporting wire is shorter than the other.

Referring now to the apparatus, a table 18 is provided with grooves 19, 20 and 21 which are of different widths and, if desired, of different depths, to receive grid structures or material of different sizes. The grooves 19, 20 and 21 are parallel with each other extending the full length of the table and terminating adjacent tunnels 22, 23 and 24 respectively. The table 18 is rigidly secured to a supporting bracket 25 the latter serving to support a housing 27 in which tubular members 28, 29 and 30 are disposed. The tunnels 22, 23 and 24 which are formed in their respective tubular members 28, 29 and 30 have reduced portions 32 to provide passageways 33 in the housing 27 completely surrounding the portions of each of the members. Due to the contour of the exit ends of the tubular members 28, 29 and 30 and the adjacent portions of the housing 27, the exhaust ends of the passageways 33 are tapered, as at 34, toward the centerline, extended, of each of the tunnels. The housing 27 is also provided with a passageway or port 36 communicating with each of the passageways 33. These passageways are controlled through the aid of a valve 37, which is tubular in cross-section and is provided with two sets of ports or outlet passageways. One set, indicated at 39, is disposed in a line parallel with the axis of the valve to open communication between a supply line 40 (Fig. 1) and all of the passageways 33.

Another set of ports, given reference numerals 41, 42 and 43, condition the valve 37 to open communication between the supply line 40 and the passageways 33, singly. This is brought about through the adjustment of the valve 37, which is rotatably disposed in the housing 27 and is adjusted through the aid of a knurled head 44. The knurled head 44 is disposed upon, and closes one end of the valve 37, the other end of the valve being connected to the supply line 40, which is a flexible tube, to connect the valve with a supply of fluid such as air under pressure.

Figure 2:
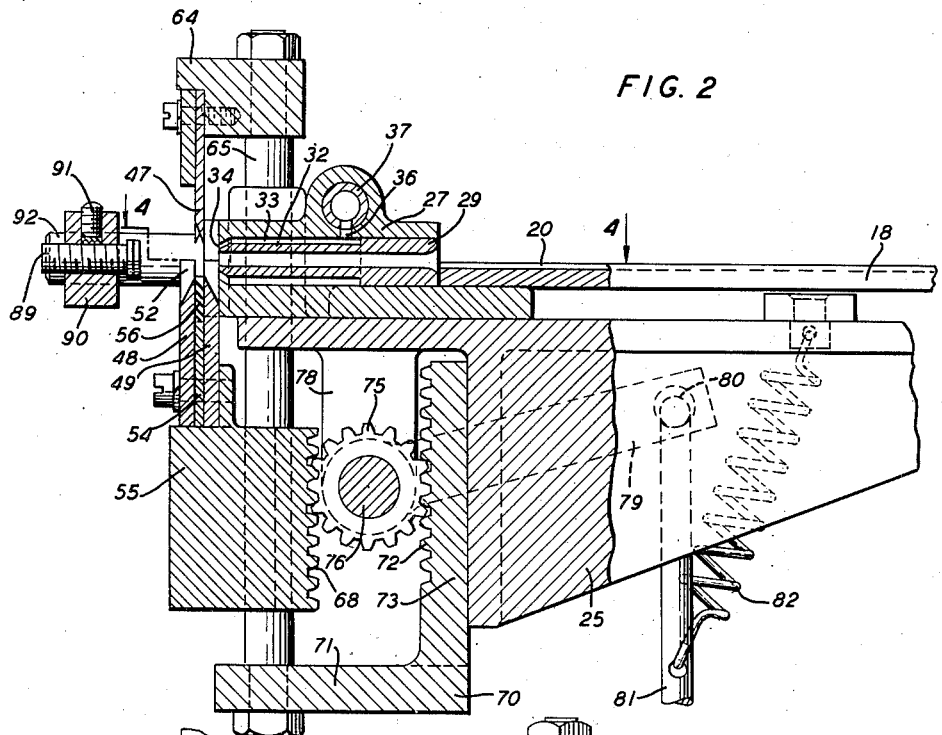
Fig. 2 is a fragmentary vertical sectional view taken along the line 2—2 of Fig. 1.
Figure 3:
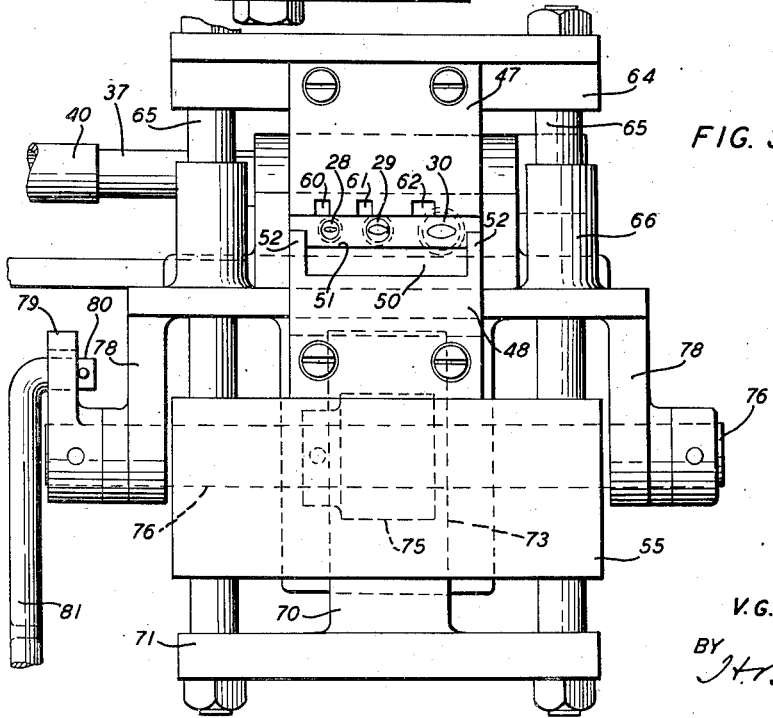
Fig. 3 is a front elevational view of the apparatus.
Figure 4:
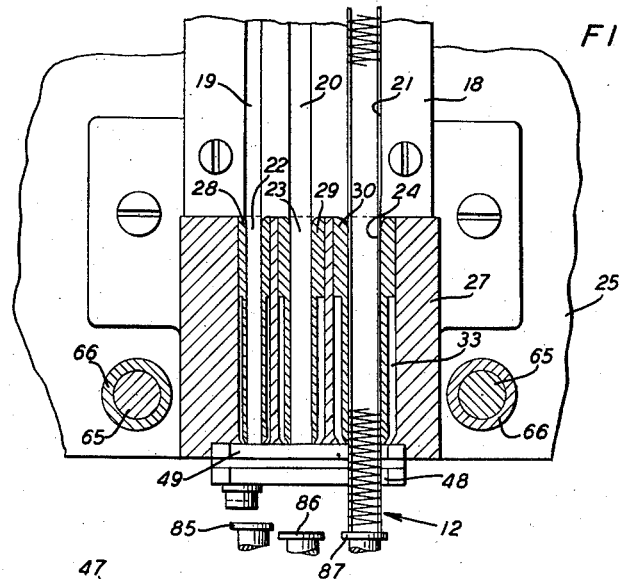
Fig. 4 is a fragmentary sectional view taken along the line 4—4 of Fig. 2.

In the present embodiment, there are three cutting elements which include an upper element 47 and a pair of lower companion elements 48 and 49. The lower elements have central beveled portions 50 resulting in cutting edges 51 leaving their extreme ends 52 projecting above the cutting edges to serve as guides for the upper cutting elements 47. The lower cutting elements, as illustrated in Fig. 2, are separated from each other by a spacer 54 and are mounted upon a supporting block or rack 55. The spacer 54 terminates short of the cutting edges 51 of the lower elements and supports a resilient member 56, the latter being formed of a suitable material such as soft rubber to cause any of the small parts severed from the material to be ejected from between the cutting elements.

Figure 5:
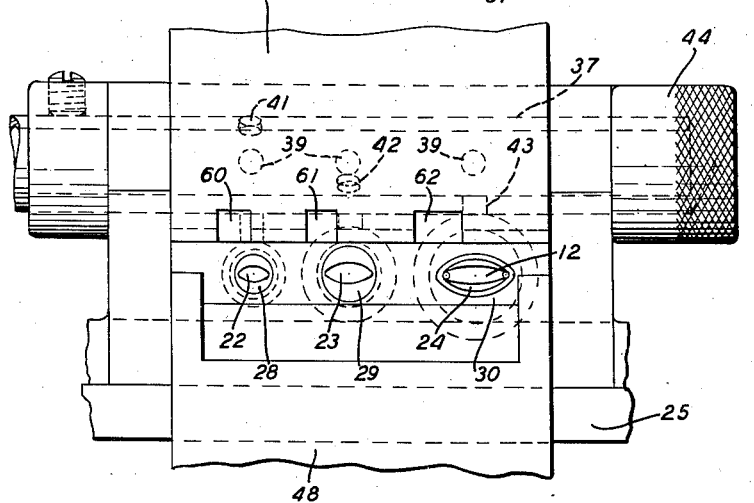
Fig. 5 is an enlarged fragmentary front elevational view of the apparatus.
Figure 6:
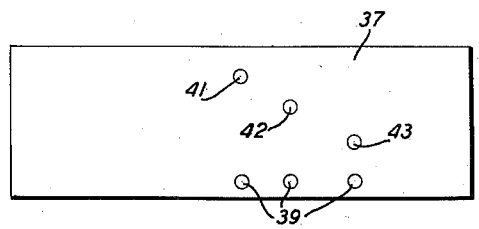
Fig. 6 is a development of the valve to show the arrangement of ports therein.

The upper cutting element 47 has a V-shaped groove 57 formed in its lower surface to provide a pair of cutting edges 58 and 59 to cooperate respectively with the cutting edges 51 of the lower cutting elements 48 and 49. The cutting edge 59 continues the full length of the cutting element 47 while cutaway portions 60, 61 and 62 are provided at spaced portions, as illustrated in Fig. 5, to remove portions of the cutting edge 58 from the element leaving at these portions only the cutting edge 59. The cutting element 47 is fixedly mounted, through the aid of a bracket 64, upon guide rods 65, the latter being disposed at spaced portions and movably mounted in bushings 66, the latter being carried by the bracket 25. The supporting block 55, which may also be termed a rack due to the teeth 68 formed in the inner surface thereof, is mounted to slide axially on the guide rods 65.

An angular member 70 having its lateral portion 71 fixed to the lower ends of the guide rods 65 is provided with teeth 72 in a vertical rack portion 73 thereof as illustrated in Fig. 2. A pinion 75 is disposed between the racks or toothed portions 55 and 73 and is fixedly mounted upon a shaft 76, the latter being journalled in suitable bearings in projections 78 of the bracket 25.

A lever 79 has one of its ends fixed to an outer end of the shaft 76, the other end of the lever being connected, as at 80, to a treadle arm 81. The treadle arm may be operated, or reciprocated, in one direction through the aid of a foot treadle (not shown), and normally urged in the opposite direction through the aid of a spring 82.

A series of stops 85, 86 and 87 serve to limit the movement of the materials through their respective tunnels 22, 23 and 24 to control the length of the portions severed therefrom. The stops have threaded portions 89 disposed in threaded apertures of an arm 90 and held in any desired adjusted positions through the aid of set screws 91. The stops may therefore be moved toward and away from their respective tunnels to vary the length of the portions cut from the materials.

Another adjusting means for the entire series of stops is incorporated in the mounting means for the arm 90 which means includes rod 92 upon which the arm 90 is mounted, the rod being movably supported in an apertured portion 94 of the bracket 25 and held in any desired position therein relative to the cutting elements through the aid of a set screw 95.

Considering now the operation of the apparatus, let it be assumed that the groove 21 with its associated tunnel 30 and stop 87 are to be employed and that the other feeding positions are to remain idle. The valve 37 is then rotated to bring the port 43 into registration with the port 36 for the tunnel 30 to open communication with the supply line 40, through the valve 37, the port 43, the adjacent port 36 and passageway 33 around the tubular member 30 escaping through the conical aperture 34 of this member. With the valve in the position described, air under pressure will continuously travel through the exhaust port 34 at this station, creating a suction forwardly through the tunnel 24 to draw the material or grid structure 12 therethrough at a sufficiently rapid speed to repeatedly advance the material during the time intervals when the cutting elements are in their open positions.

Beginning with the cutting elements in the open positions shown in the drawings, the grid structure or material will be forced, through the creation of the suction in the tunnel 24, until the leading ends of the supporting wires 10 engage the stop 87. At this time, the operator may cause operation of the cutting elements by pressing the treadle (not shown) moving the actuating or treadle rod 81 downwardly against the force of the spring 82 to move the lever 79, Fig. 2, clockwise to cause the rack 73 to move downwardly and the rack 55 to move upwardly. As a result of these movements, the cutting elements are moved simultaneously into cutting positions, the upper element moving downwardly and the lower elements moving upwardly so that they will meet the material or grid structure simultaneously and sever the desired length from the structure.

During the cutting operation, the cutaway portion 62 of the cutting element 47 will register with one of the supporting wires 10 so that only a single cut will be made in that wire, while a portion equal in length to the width of the cutting element will be cut from the other supporting wire, all three of these cuts being made through the cooperation of the cutting edges 58 and 59 of the element 47 and the cutting edges 51 of the lower elements 48 and 49. Furthermore, the grid wire 11 will be cut by one of the sets of cutting edges due to the fact that a portion of one of the spiral convolutions of the grid wire will traverse one set of cutting edges. In this manner, a complete length of the grid structure, as illustrated in Fig. 8, will be severed from the main structure completing a grid with one supporting wire shorter than the other.

After a length has been cut from the grid structure, the constant suction in the tunnel through the travel of the air under pressure relative thereto, continuously urges the grid structure forwardly, but this structure is held against forward movement until the cutting elements are moved toward their open positions. Therefore, when the operator releases the treadle to allow the spring 82 to pull the rod 81 upwardly and to rock the lever 79 counterclockwise, the action of the pinion 75 on the racks 55 and 73 will cause the cutting elements to move into their open positions freeing the material or grid structure, so that it may be advanced an additional length under the control of its stop 87 conditioning the apparatus for another cycle of operation. In this manner the apparatus may be operated rapidly and in repeated cycles due to the constant forward movement of the material. Furthermore, once the material is placed in its groove on the table with its leading ends extending into the associated tunnel, there is no need for further handling of the material or grid structure. It will also be apparent that, due to the associated suction in the tunnel created by the air under pressure travelling in a direction relative to the exit end of the tunnel to create the suction, the grid structure will tend to float in the tunnel, eliminating wear and possible damage to the grid structure, which might exist should this structure require manual movement through its groove and tunnel.

If it is desirable to use either the other feeding stations, the operator may adjust the valve 37 to open either of the ports 41 or 42. Furthermore, if the operator should desire to use all of these stations simultaneously, this may be accomplished by positioning the ports 39 in registration with the ports for the tunnels.

Although specific improvements of the invention have been shown and described, it will be understood that they are but illustrative and that various modifications may be made therein without departing from the scope and spirit of this invention as defined by the appended claims.

What is claimed is:

1. A material working apparatus comprising an operable material working element, means to operate the element relative to a plurality of paths leading toward the element, tunnels of various sizes for materials of various sizes forming parts of the paths, and means to cause air under pressure to be directed to any selected one of the tunnels to cause a material to be moved through the selected tunnel relative to the element.

2. A material working apparatus comprising an operable material working element, tunnels of various sizes for materials of various sizes forming parts of the paths, a valve adapted to be actuated and including ports for the tunnels, and means including the valve to cause air under pressure to be directed to any selected one of the tunnels to cause the material for the selected tunnels to be moved therethrough relative to the element.

3. A material working apparatus comprising an operable material working element, tunnels of various sizes for materials of various sizes forming parts of the paths, a valve adapted to be actuated and including ports for the tunnels, and means under the control of the valve to cause air under pressure to be directed to any one or all of the tunnels to cause the material therefor to be moved therethrough relative to the element.

4. A material working apparatus comprising an operable material working element, means to operate the element relative to a given path, a tunnel forming a part of the path, and means to direct air under pressure toward the exit end of the tunnel to create a suction in the tunnel to cause movement of the material therethrough and relative to the element, and a stop for the material disposed across the path.

5. A material working apparatus comprising an operable material working element, means to operate the element relative to a plurality of paths leading toward the element, tunnels of various sizes for materials of various sizes forming parts of the paths, means to cause air under pressure to be directed to any selected one of the tunnels to cause a material to be moved through the selected tunnel relative to the element, and variable stops for the materials disposed across their respective paths.

6. A material working apparatus comprising means to advance a grid structure longitudinally in a given path, the grid structure including a spirally wound grid wire and spaced supporting wires therefor, a cutting element having spaced cutting edges and a cutaway portion removing a portion of one of the cutting edges, and companion cutting elements mounted to respectively cooperate with the cutting edges of the first mentioned element, and means to cause relative movement of the first cutting element and the companion cutting elements to cause the elements to cut a portion of a given length from the structure and simultaneously therewith cut a part from one of the supporting wires of the portion.

7. A material working apparatus comprising means to advance a grid structure longitudinally in a given path, the grid structure including a spirally wound grid wire and spaced supporting wires therefor, a cutting element having spaced cutting edges, one extending across the path of both said supporting wires and the other across the path of but one of the supporting wires, means to move the element relative to the path, and means cooperating with the element to cut a portion from the structure and simultaneously cut an end from one of the supporting wires of the portion.

8. A material working apparatus comprising means to advance a grid structure longitudinally in a given path, the grid structure including a spirally wound grid wire and spaced supporting wires therefor, a cutting element having spaced cutting edges, one extending across the path of both said supporting wires and the other across the path of but one of the supporting wires, means to move the element relative to the path, means cooperating with the element to cut a portion from the structure and simultaneously cut an end from one of the supporting wires of the portion, and means variable to control the cutting of portions of varied lengths from the structure by the element and its cooperating means.

9. A material working apparatus comprising means to advance a grid structure longitudinally in a given path, the grid structure including a spirally wound grid wire and spaced supporting wires therefor, a cutting element having spaced cutting edges, one extending across the path of both said supporting wires and the other across the path of but one of the supporting wires, means to move the element relative to the path, a tunnel forming a part of the path, means to direct air under pressure relative to the tunnel to cause movement of the structure in the path, through the tunnel and relative to the element, and means cooperating with the element to cut a portion from the structure and simultaneously cut an end from one of the supporting wires of the portion.

10. A material working apparatus comprising means to intermittently advance a grid structure longitudinally in a given path, the grid structure including a spirally wound grid wire and spaced supporting wires therefor, cutting elements relatively movable across the said path and having certain cooperating cutting edges to cut portions of given lengths from the structure, and other cutting edges cooperating to cut given lengths from one of the supporting wires, and means to cause relative movement of the cutting elements.

11. A material working apparatus comprising means to intermittently advance a grid structure longitudinally in a given path, the grid structure including a spirally wound grid wire and spaced supporting wires therefor, cutting elements relatively movable across the said path and having certain cooperating cutting edges to cut portions of given lengths from the structure, and other cutting edges cooperating to cut given lengths from one of the supporting wires, means to cause relative movement of the cutting elements, and means to cause variation in the longitudinal advancement of the structure to vary the lengths of the portions cut therefrom.

12. A material working apparatus comprising a material working element, means to operate the element relative to a plurality of paths in which materials may be advanced, individual tunnels forming parts of their respective paths, a supply line for air under pressure, and a valve connected to the supply line and movable relative to the tunnels to singly connect the tunnels to the supply to direct the air under pressure into the selected tunnel short of the exit end thereof to cause movement of the material therein relative to the element.

13. A material working apparatus comprising a material working element, means to operate the element relative to a plurality of paths in which materials may be advanced, individual tunnels forming parts of their respective paths, a supply line for air under pressure, and a valve connected to the supply line and movable relative to the tunnels to simultaneously connect the tunnels to the supply to direct the air under pressure into the selected tunnel short of the exit end thereof to cause movement of the material therein relative to the element.

14. A material working apparatus comprising a material working element, means to operate the element relative to a plurality of paths in which materials may be advanced, individual tunnels forming parts of their respective paths, a supply line for air under pressure, a valve connected to the supply line and movable relative to the tunnels to simultaneously connect the tunnels to the supply to direct the air under pressure into the selected tunnel short of the exit end thereof to cause movement of the material therein relative to the element, and variable stops in alignment with the tunnels to vary the lengths of the portions of the materials fed to the element.

VINCENT G. JARMAN.

REFERENCES CITED

The following references are of record in the file of this patent:

UNITED STATES PATENTS

| Number | Name | Date |
|---|---|---|
| 978,826 | Walton et al. | Oct. 30, 1934 |